(12) United States Patent
Hughes (10) Patent No.: US 6,364,810 B1
(45) Date of Patent: Apr. 2, 2002

(54) AUTOMATIC SPLITTER CONTROL FOR MANUALLY SHIFTED TRANSMISSION

(75) Inventor: Douglas A. Hughes, Wixom, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/634,425

(22) Filed: Aug. 8, 2000

(51) Int. Cl.$^7$ ............................................... F16H 59/30
(52) U.S. Cl. ...................................... 477/124; 477/908
(58) Field of Search ................................. 477/115, 116, 477/124, 908, 110, 111, 107

(56) References Cited

U.S. PATENT DOCUMENTS

| | | | |
|---|---|---|---|
| 4,361,060 A | 11/1982 | Smyth | 477/124 |
| 4,754,665 A | 7/1988 | Vandervoort | 74/745 |
| 5,390,561 A | 2/1995 | Stine | 74/331 |
| 5,411,450 A * | 5/1995 | Gratton et al. | 477/124 |
| 5,435,212 A | 7/1995 | Menig | 74/745 |
| 5,592,851 A | 1/1997 | Bates et al. | 74/336 |
| 5,682,790 A * | 11/1997 | Genise | 477/124 X |
| 5,755,639 A | 5/1998 | Genise et al. | 477/111 |
| 5,766,111 A | 6/1998 | Steeby et al. | 477/124 |
| 5,791,189 A | 8/1998 | Newbigging | 74/735 |
| 5,911,787 A | 6/1999 | Walker | 74/335 |
| 5,938,711 A | 8/1999 | Steeby et al. | 701/52 |
| 5,974,906 A | 11/1999 | Stine et al. | 74/335 |
| 6,007,455 A | 12/1999 | Steeby | 477/109 |
| 6,015,366 A * | 1/2000 | Markyvech et al. | 477/107 X |
| 6,042,504 A * | 3/2000 | Gualitieri et al. | 477/124 X |
| 6,105,449 A * | 8/2000 | Genise et al. | 477/124 X |
| 6,109,126 A * | 8/2000 | Cochran et al. | 477/908 X |
| 6,257,080 B1 * | 7/2001 | Ore | 477/79 X |

* cited by examiner

Primary Examiner—Charles A Marmor
Assistant Examiner—Roger Pang
(74) Attorney, Agent, or Firm—Howard D. Gordon (57) ABSTRACT

A controller-assisted, manually shifted compound transmission system (10) and splitter shift control method therefor. Auxiliary splitter section (16B) shifts are automatically implemented by a splitter shifter (28) under commands (56) from a controller (54). The splitter ratio to be engaged is determined as a function of a target engine speed ($ES_T$) under sensed and expected vehicle operating conditions.

14 Claims, 6 Drawing Sheets

AUTOMATIC SPLITTER CONTROL FOR MANUALLY SHIFTED TRANSMISSION

BACKGROUND OF THE INVENTION

1. Field of the Invention

The present invention relates to automatic splitter shifting in a manually shifted compound transmission having a lever-shifted main section connected in series with an auxiliary splitter or splitter-and-range section. In particular, the present invention relates to a splitter control for transmissions of the type described for automatically implementing splitter shifts and/or splitter-and-range shifts during a manual lever shift.

2. Description of the Prior Art

Controller-assisted, manually shifted transmission systems are known in the prior art, as may be seen by reference to U.S. Pat. Nos. 5,582,558; 5,755,639; 5,766,111; 5,791,189; 5,974,906; 5,989,155 and 6,015,366, the disclosures of which are incorporated herein by reference.

Compound transmissions having a range and/or combined range-and splitter-type auxiliary transmission section are well known in the prior art, as may be seen by reference to U.S. Pat. Nos. 4,754,665 and 5,390,561, the disclosures of which are incorporated herein by reference.

Transmissions having manually shifted main sections and automatically shifted splitter sections are known in the prior art, as may be seen by reference to U.S. Pat. Nos. 5,435,212; 5,938,711; 6,007,455 and 6,044,721, the disclosures of which are incorporated herein by reference.

Compound transmissions having automatically implemented range shifting are well known in the prior art, as may be seen by reference to U.S. Pat. Nos. 5,911,787 and 5,974,906, the disclosures of which are incorporated herein by reference.

In certain controller-assisted, manually shifted transmissions, splitter shifts are automatically implemented and, during a lever shift, the splitter is shifted to neutral and retained in neutral until the main section is engaged in the position selected by the operator. The system controller must then determine if the splitter should be engaged/reengaged in splitter-high or splitter-low and command engagement of the appropriate splitter ratio.

SUMMARY OF THE INVENTION

In accordance with the present invention, a manually shifted compound transmission with a splitter or combined splitter-and-range auxiliary section is provided which will automatically shift the splitter section and/or automatically disengage and then reengage the splitter section during a lever shift. Logic rules are provided to determine which splitter ratio should be reengaged after the splitter is shifted to neutral during a manual lever shift.

The foregoing is accomplished in a manually shifted compound transmission having a lever-shifted main section connected in series with a splitter or combined splitter-and-range auxiliary section having an actuator for automatically implementing controller-initiated splitter shifts by sensing vehicle operating conditions, determining a target engine speed under such conditions, and engaging the splitter section in the splitter ratio which will result in an engine speed closest to the target engine speed. Preferably, the target engine speed will be midway between the upshift and downshift engine speeds for existing vehicle operating conditions. Preferably, a display and/or alarm or the like will be activated to inform the driver of the currently engaged ratio and/or splitter position.

Accordingly, it is an object of the present invention to provide a new and improved splitter shift control for manually shifted compound transmissions having a splitter shifter for automatically implementing splitter shifts.

This and other objects and advantages of the present invention will become apparent from a reading of the following description of the preferred embodiment taken in connection with the attached drawings.

DESCRIPTION OF THE PREFERRED EMBODIMENT

A computer-assisted (i.e., microprocessor-based, controller-assisted) vehicular compound mechanical transmission system 10, particularly well suited to utilize the splitter shifting control of the present invention, may be seen by reference to FIGS. 1, 2, 3 and 4.

Figure 1:
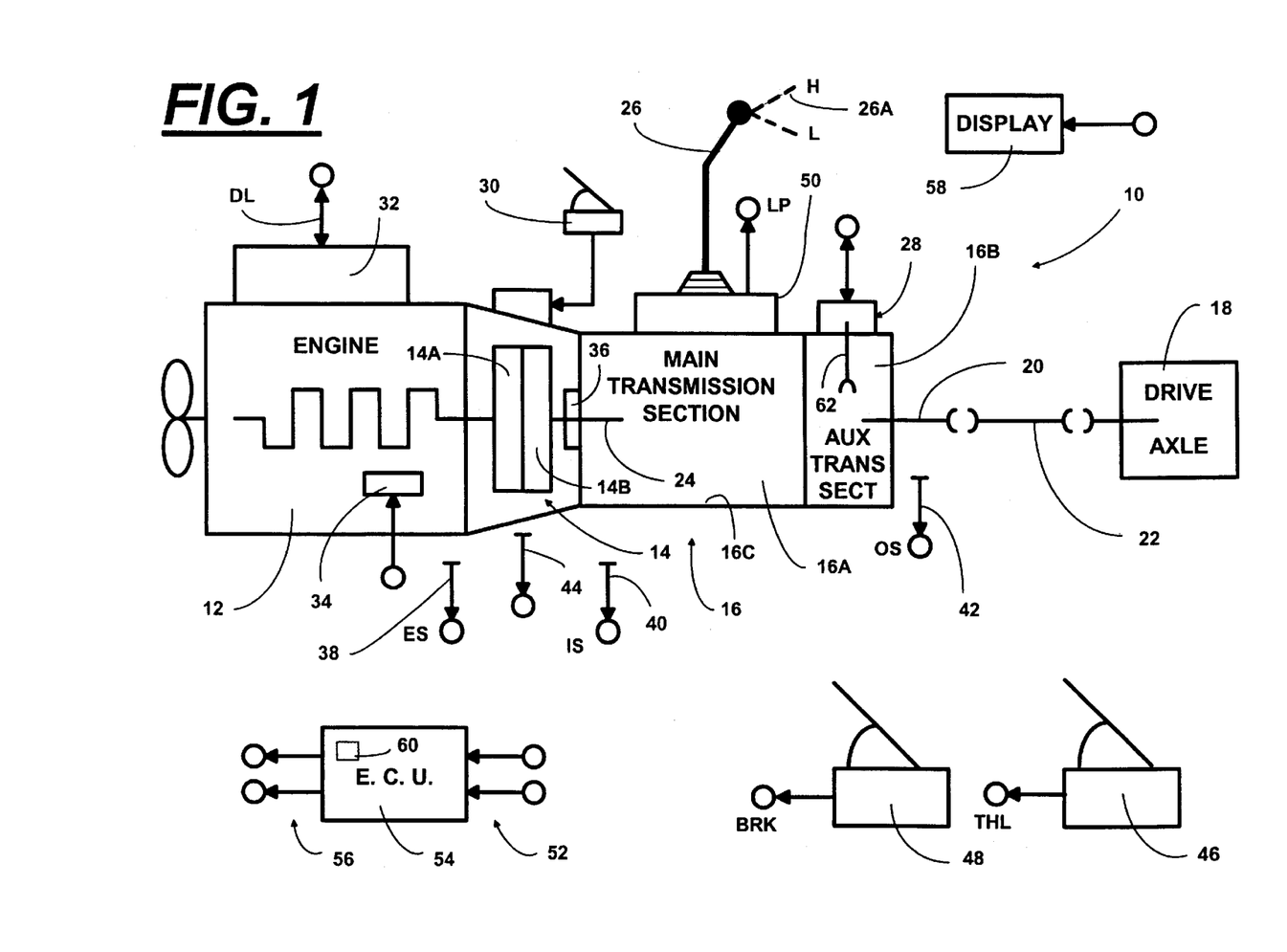
FIG. 1 is a schematic illustration of a controller-assisted, manually shifted compound transmission advantageously utilizing the splitter control of the present invention.

System 10 is of the type commonly utilized in heavy-duty vehicles and includes an engine, typically a diesel engine 12, a master friction clutch 14 contained within a clutch housing, a multiple-speed compound transmission 16, and a vehicular drive axle assembly 18. The transmission 16 includes an output shaft 20 drivingly coupled to a vehicle drive shaft 22 by universal joints for driving the drive axle assembly.

Master friction clutch 14 includes driving friction members 14A driven by the engine and driven friction members 14B, which are carried by the transmission input shaft 24. Compound mechanical change-gear transmission 16 will typically include a main transmission section 16A and a splitter- or combined splitter-and-range-type auxiliary transmission section 16B, all contained within a common transmission housing 16C. Compound mechanical change-gear transmissions of this type are well known in the prior art, and examples thereof may be seen by reference to aforementioned U.S. Pat. Nos. 4,754,665 and 5,390,561.

Figure 3:
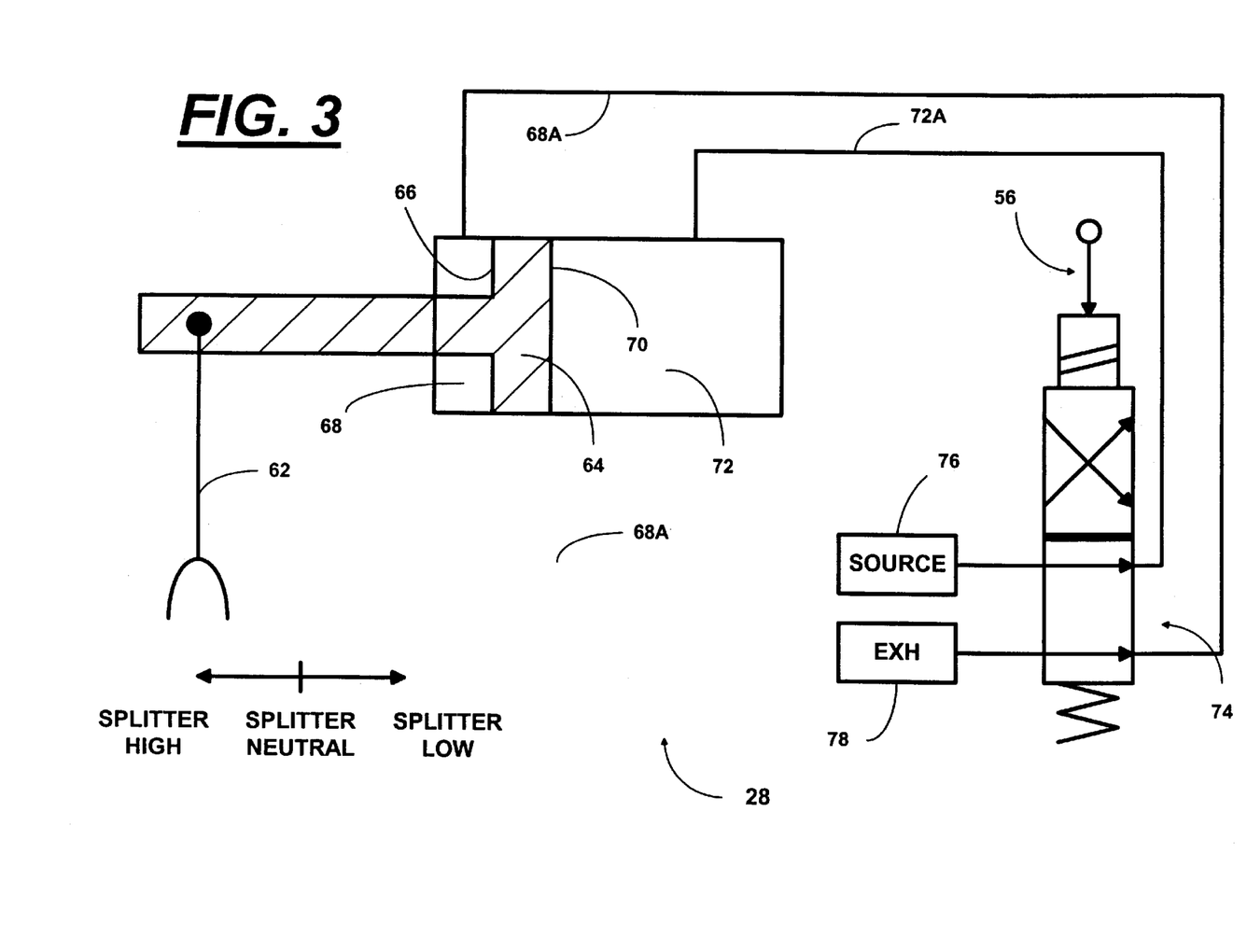
FIG. 3 is an enlarged schematic illustration of a preferred embodiment of the splitter shift mechanism of the present invention.

The main transmission section 16A is manually shifted by a manually operated shift lever 26, while the range-type auxiliary transmission section 16B is shifted by a splitter or splitter-and-range actuator assembly 28, one example of which is schematically illustrated in FIG. 3, to be described in greater detail below.

A clutch pedal 30 is provided for manually operating master clutch 14, although clutch 14 could also be automatically operated within the scope of the present invention. Dynamic shifting may be done without disengaging the master clutch (see U.S. Pat. No. 4,850,236).

Engine 12 is preferably electronically controlled and includes an engine controller 32 communicating over an electronic data link DL. Preferably, the data link will operate under an industry standard protocol, such as SAE J-1922, SAE J-1939, ISO 11898 or the like. The system also may include an engine compression brake 34 and/or an input shaft retarding device, such as an inertia brake 36.

The system may include sensors 38 for sensing engine rotational speed (ES), 40 for sensing input shaft rotational speed (IS), 42 for sensing output shaft rotational speed (OS), 44 for sensing the engaged or disengaged condition of the clutch, 46 for sensing the operator-set throttle pedal position (THL), 48 for sensing operation of the vehicle brake system (BRK), 50 for sensing the position of the main section shifting mechanism (MS), and the like. Position sensor 50 will send an output signal LP indicative of lever position in a shift pattern (see U.S. Pat. No. 5,743,143, the disclosure of which is incorporated herein by reference). Signal LP will be indicative of the engaged or being-engaged main section ratio. These and other sensors will send input signals 52 to a controller 54, which will process same according to predetermined logic rules to issue command output signals 56 to various system actuators.

The controller or ECU 54 is preferably a microprocessor-based control unit of the type illustrated in U.S. Pat. Nos. 4,595,986; 4,361,065 and 5,335,566, the disclosures of which are incorporated herein by reference. Controller 54 may be incorporated into the engine control 32.

The system actuators operated by the ECU output signals 56 will include the splitter section actuator 28 and possibly the engine controller 32, the engine compression brake 34, the input shaft or upshift brake 36, and a display unit 58. ECU 54 may include a timing unit 60.

The splitter shift mechanism 28 may be seen in greater detail by reference to the schematic illustration of FIG. 3. The three-position splitter shift mechanism 28 includes a shift fork 62 for positioning a splitter clutch, typically a double-sided jaw clutch, in either the splitter-high, splitter-neutral or splitter-low position. Shift fork 62 is carried or positioned by a piston 64 having a piston face 66 exposed to selectively pressurized and exhausted chamber 68 and a piston face 70 exposed to the selectively pressurized and exhausted piston chamber 72. Chamber 68 and chamber 72 are selectively pressurized and exhausted by means of a two-position, three-way, solenoid-controlled valve 74, which will selectively connect conduits 68A and 72A to either the source of pressurized fluid 76 or to an exhaust to atmosphere 78. The solenoid-controlled valve 74 is operated in response to command output signals 56 from the ECU 54, which may involve pulse-width modulation or the like. See also, U.S. Pat. No. 5,661,998, the disclosure of which is incorporated herein by reference. While a pressure-actuated range shift mechanism 28 is illustrated, it is understood that, within the scope of the present invention, the range shift mechanism 28 could also utilize hydraulic and/or electric actuators or the like.

Figure 2:
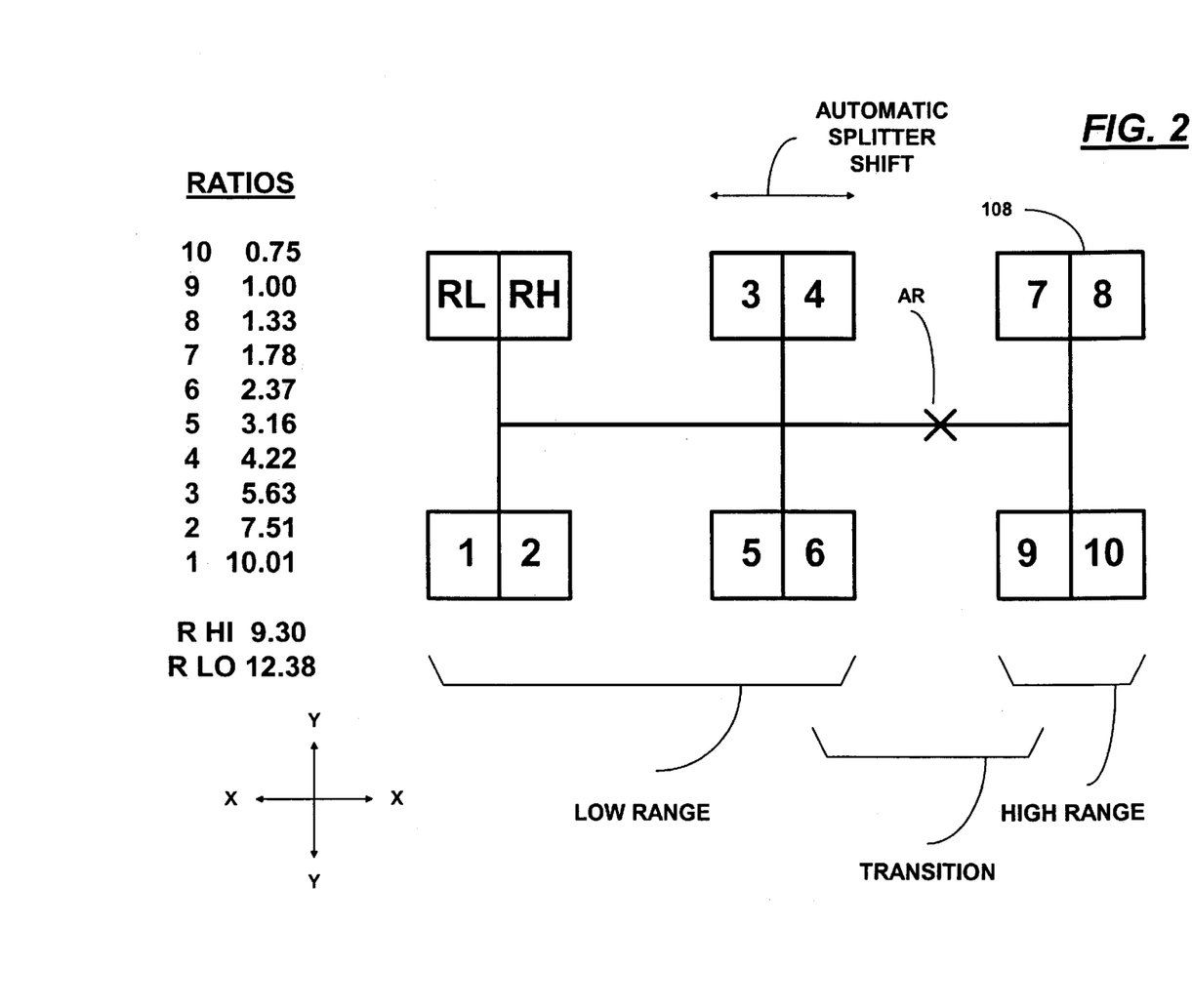
FIG. 2 is a schematic illustration of a shift pattern for a preferred embodiment of the transmission of FIG. 1.
Figure 2A:
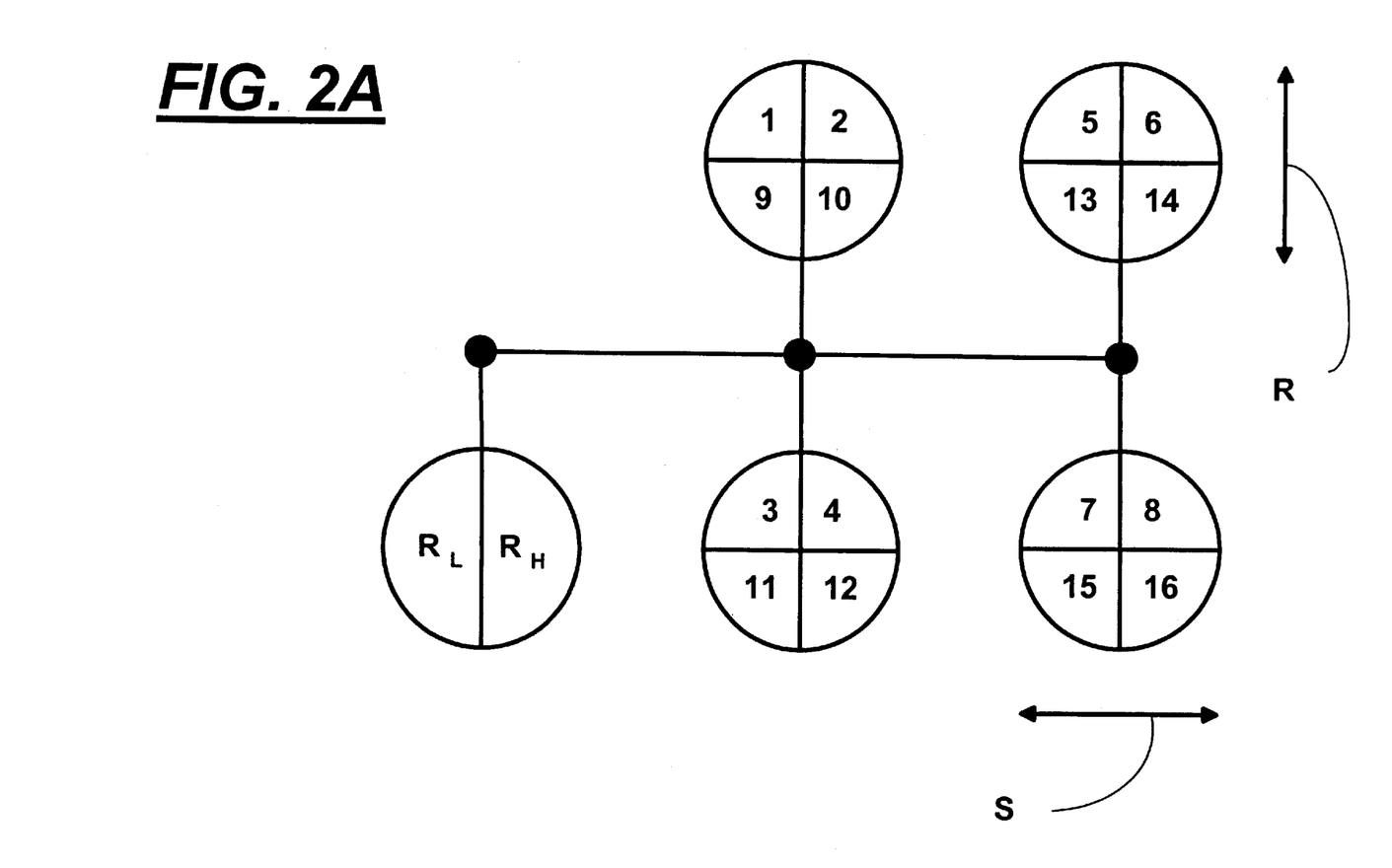
FIG. 2A is a schematic illustration of an alternate shift pattern for an embodiment of the transmission of FIG. 1.

FIG. 2 schematically illustrates the shift pattern for a preferred embodiment of compound transmission 16. In the embodiment illustrated in FIG. 2, the transmission is a 10-forward-speed transmission having a combined range-and-splitter-type auxiliary section. Transmissions of this type are well known in the prior art and are sold under the trademark 'Super-10' by the assignee of this invention, Eaton Corporation, and may be seen in greater detail by reference to U.S. Pat. No. 5,000,060, the disclosure of which is incorporated herein by reference. As is known, each of the large rectangular blocks of the shift pattern represents a shift lever position, while the vertical divisions of the blocks represent (preferably automatic) splitter shifts within each shift lever position. The main transmission section 16A has four selectively engageable main section ratios, one for reverse, one for 1/2, one for 3/4 or 7/8, and one for 5/6 or 9/10. In other words, the 3/4 shift lever position engages the same main section gear as does the 7/8 shift lever position. However, in the 3/4 position, the range is in the low range ratio, and in the 7/8 shift lever position, the range is in the high ratio. As the shift lever is moved from the middle leg of the shift pattern (3/4 and 5/6) to the left leg (7/8 and 9/10), a manual selection or initiation of an automatically implemented range shift occurs. Shift patterns of this type are commonly referred to as "double-H" type shift patterns. Alternatively, in a "repeat-H" type shift pattern, range shifts may be manually implemented by using a range position selector 26A, as shown in dotted lines in FIG. 1.

Assisted, manually shifted transmission 10 will have fully automatic splitter shifting, as shown in aforementioned U.S. Pat. No. 5,755,639, and/or will automatically shift to transmission-neutral during lever shifts and then reengage in an appropriate splitter ratio after the main section has engaged, as shown in aforementioned U.S. Pat. No. 6,044, 721. As vehicle speeds often change during a shift, it is necessary to provide logic rules for determining the splitter ratio to be engaged at completion of a lever shift involving an automatic shift to splitter-neutral during the lever shift.

According to the present invention, when the splitter ratio is being automatically engaged from a splitter-neutral position, the splitter will be engaged in the splitter ratio (splitter-high or splitter-low) which, under current or expected vehicle operation conditions, will result in engine speed most closely equaling a target engine speed. The target engine speed will be a value which is determined as a function of operator throttle position (also percent demand for engine torque).

In a preferred embodiment of the present invention (see FIG. 4), the target engine speed 100 is midway between the upshift and downshift engine speed for a particular throttle position (torque demand).

Figure 4:
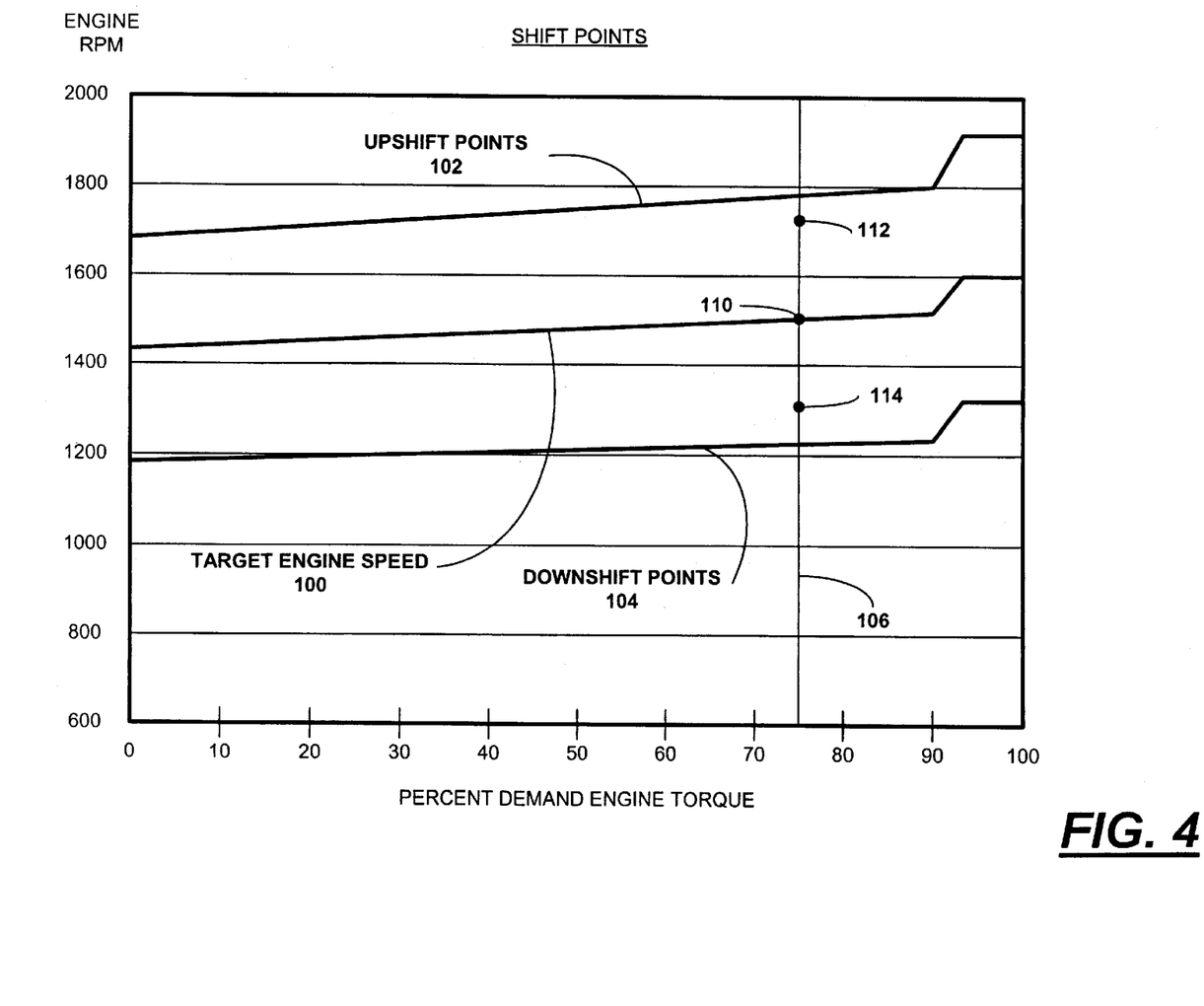
FIG. 4 is a chart of upshift and downshift engine speeds and target engine speeds at various throttle positions (expressed as a percent of maximum engine torque).

By way of example, referring to FIGS. 2 and 4, assuming a 75% engine torque demand (line 106) and an expected output shaft speed of 1000 RPM (OS=1000) at completion of a lever shift to the 7/8 lever position 108, target engine speed 110 equals about 1520 RPM ($ES_T$=1520), engine speed in 7th gear 112 will be about 1780 RPM ($ES_7$=1780), and engine speed in 8th gear 114 will be about 1330 RPM ($ES_8$=1330). The expected engine speeds are calculated using the known relationship that, with the clutch engaged, ES=IS=OS*GR.

Accordingly, in splitter-high (8th gear), the difference between engine speed and target engine speed is about 190 RPM ($ES_T$−$ES_8$=1520−1330=190 RPM), while in splitter-low (7th gear), the difference between engine speed and target engine speed is about 260 RPM ($ES_7$−$ES_T$=1780−1520=260 RPM). Accordingly, splitter-high (or 8th speed) will be engaged.

Figure 5:
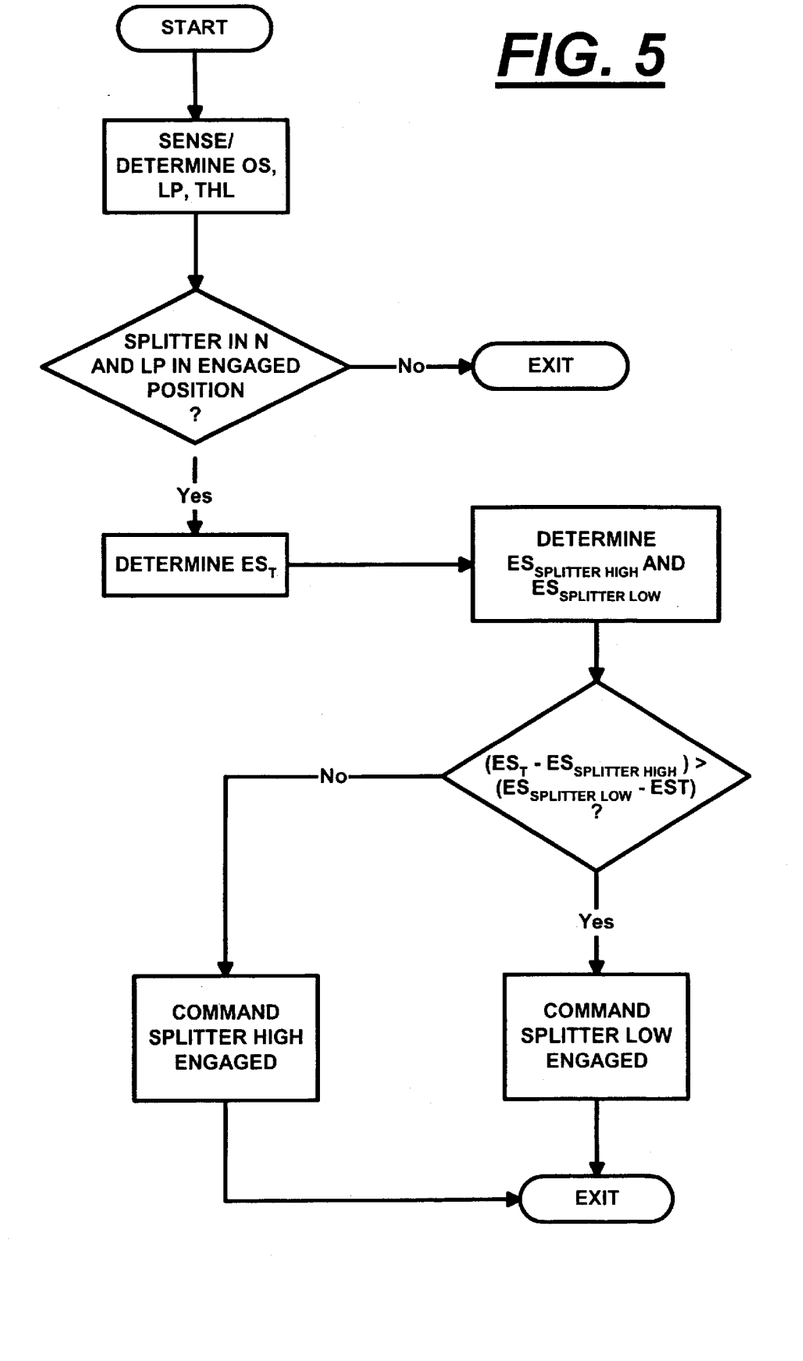
FIG. 5 is a schematic illustration, in flow chart format, of the splitter control of the present invention.

The splitter control of the present invention is shown in flow chart format in FIG. 5.

Accordingly, it may be seen that a new and improved splitter control is provided.

Although the present invention has been described with a certain degree of particularity, it is understood that the description of the preferred embodiment is by way of example only and that numerous changes to form and detail are possible without departing from the spirit and scope of the invention as hereinafter claimed.

I claim:

1. A method for controlling splitter shifting in a controller-assisted, manually shifted vehicular transmission system (10) comprising an internal combustion engine (12) driving an input shaft (24) of a compound transmission (16) having a multiple-ratio main section (16A) shifted by a shift lever (26) manually movable in a shift pattern and a splitter auxiliary section (16B) connected in series with said main section, said splitter auxiliary section shiftable to a selected one of (i) splitter-high ratio, (ii) splitter-neutral and (iii) splitter-low ratio, a splitter shift mechanism (28) for automatically implementing splitter shifts and a controller (54) for receiving input signals (52) indicative of system operating conditions and for processing same according to predetermined logic rules to issue command output signals (56) to system actuators, including said splitter shift mechanism, said method comprising the steps:

sensing one of (i) a currently engaged condition of the main section and (ii) an intended engaged condition of the main section;

determining if the splitter section is in the splitter-high, splitter-neutral or splitter-low position;

determining a target engine speed ($ES_T$) under existing vehicle operating conditions;

if (i) said main section is one of (1) engaged and (2) engaging in a known ratio and (ii) said auxiliary section is in splitter-neutral;

(a) determining expected engine speed if said auxiliary section is engaged in splitter-high ratio (ESSPLITTER-HIGH) and expected engine speed if said auxiliary section is engaged in splitter-low ratio ($ES_{SPLITTER-LOW}$), and (b) commanding the splitter auxiliary section to be engaged in a splitter ratio determined as a function of said target engine speed and said expected engine speeds.

2. The method of claim 1 wherein said target engine speed at existing vehicle operating conditions (110) is determined as a function of upshift (102) and downshift (104) engine speeds at existing vehicle operating conditions.

3. The method of claim 2 wherein said target engine speed at existing vehicle operating conditions is about the average of said upshift and downshift engine speeds.

4. The method of claim 1 wherein said splitter section is caused to be engaged in the splitter ratio wherein the expected engine speed in that ratio is closest to said target engine speed.

5. The method of claim 2 wherein said splitter section is caused to be engaged in the splitter ratio wherein the expected engine speed in that ratio is closest to said target engine speed.

6. The method of claim 1 further comprising, after step (b):

(c) informing the operator of the currently engaged splitter ratio.

7. The method of claim 1 wherein sensing a current engaged condition of the main section comprises sensing a position of said shift lever in said shift pattern.

8. A controller-assisted, manually shifted vehicular transmission system (10) comprising an internal combustion engine (12) driving an input shaft (24) of a compound transmission (16) having a multiple-ratio main section (16A) shifted by a shift lever (26) manually movable in a shift pattern and a splitter auxiliary section (16B) connected in series with said main section, said splitter auxiliary section shiftable to a selected one of (i) splitter-high ratio, (ii) splitter-neutral and (iii) splitter-low ratio, a splitter shift mechanism (28) for automatically implementing splitter shifts and a controller (54) for receiving input signals (52) indicative of system operating conditions and for processing same according to predetermined logic rules to issue command output signals (56) to system actuators, including said splitter shift mechanism, said transmission system characterized by:

a position sensor for sensing one of (i) a currently engaged and (ii) an intended engaged condition of the main section;

means for determining if the splitter section is in the splitter-high, splitter-neutral or splitter-low position, said controller including logic rules for:

(1) determining a target engine speed ($ES_T$) under existing vehicle operating conditions;

(2) if (i) said main section is one of (i) engaged and (ii) engaging in a known ratio and (ii) said auxiliary section is in splitter-neutral;

(a) determining expected engine speed if said auxiliary section is engaged in splitter-high ratio ($ES_{SPLITTER-HIGH}$) and expected engine speed if said auxiliary section is engaged in splitter-low ratio ($ES_{SPILLER-LOW}$), and (b) commanding the splitter auxiliary section to be engaged in a splitter ratio determined as a function of said target engine speed and said expected engine speeds.

9. The system of claim 8 wherein said target engine speed at existing vehicle operating conditions (110) is determined as a function of upshift (102) and downshift (104) engine speeds at existing vehicle operating conditions.

10. The system of claim 9 wherein said target engine speed at existing vehicle operating conditions is about the average of said upshift and downshift engine speeds.

11. The system of claim 8 wherein said splitter section is caused to be engaged in the splitter ratio wherein the expected engine speed in that ratio is closest to said target engine speed.

12. The system of claim 9 wherein said splitter section is caused to be engaged in the splitter wherein the expected engine speed in that ratio is closest to said target engine speed.

13. The system of claim 8 wherein said logic rules further comprise logic rules effective for:

(c) informing the operator of the currently engaged splitter ratio.

14. The system of claim 8 wherein sensing a current engaged condition of the main section comprises sensing a position of said shift lever in said shift pattern.

* * * * *

UNITED STATES PATENT AND TRADEMARK OFFICE
CERTIFICATE OF CORRECTION

PATENT NO. : 6,364,810 B1
DATED : April 2, 2002
INVENTOR(S) : Hughes

It is certified that error appears in the above-identified patent and that said Letters Patent is hereby corrected as shown below:

Title page,
Item [*], Notice, delete the phrase "by 0 days" and insert -- by 57 days --

Signed and Sealed this

Twenty-first Day of September, 2004

JON W. DUDAS
*Director of the United States Patent and Trademark Office*